US012388930B2

(12) United States Patent
Swerdlow

(10) Patent No.: US 12,388,930 B2
(45) Date of Patent: Aug. 12, 2025

(54) FILTERING SENSITIVE TOPIC SPEECH WITHIN A CONFERENCE AUDIO STREAM

(71) Applicant: Zoom Communications, Inc., San Jose, CA (US)

(72) Inventor: Nick Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 86 days.

(21) Appl. No.: 17/977,725

(22) Filed: Oct. 31, 2022

(65) Prior Publication Data

US 2024/0146846 A1    May 2, 2024

(51) Int. Cl.
*H04M 3/56* (2006.01)
*G10L 15/08* (2006.01)
*G10L 25/51* (2013.01)

(52) U.S. Cl.
CPC ............ *H04M 3/568* (2013.01); *G10L 15/08* (2013.01); *G10L 25/51* (2013.01)

(58) Field of Classification Search
CPC ......... H04M 3/568; G10L 15/08; G10L 25/51
USPC ............ 379/202.01, 201.01, 203.01, 204.01, 379/207.02, 201.05
See application file for complete search history.

(56) References Cited

U.S. PATENT DOCUMENTS

| | | |
|---|---|---|
| 8,121,845 B2 | 2/2012 | Kirby |
| 8,537,978 B2 | 9/2013 | Jaiswal et al. |
| 9,413,891 B2 | 8/2016 | Dwyer et al. |
| 9,443,518 B1 * | 9/2016 | Gauci .................. G06F 40/169 |
| 10,432,687 B1 | 10/2019 | Hanes et al. |
| 10,764,534 B1 | 9/2020 | Shevchenko et al. |
| 11,450,334 B2 | 9/2022 | Pichaimurthy et al. |
| 11,563,855 B1 | 1/2023 | Spivak et al. |
| 2004/0263636 A1 | 12/2004 | Cutler et al. |
| 2007/0230372 A1 * | 10/2007 | He ........................ H04L 65/403 370/260 |
| 2013/0139259 A1 | 5/2013 | Tegreene |
| 2013/0329866 A1 | 12/2013 | Mai et al. |
| 2014/0028784 A1 | 1/2014 | Deyerle et al. |
| 2015/0012270 A1 | 1/2015 | Reynolds |
| 2015/0149173 A1 | 5/2015 | Korycki |

(Continued)

OTHER PUBLICATIONS

MyFone, 6 Popular Real-Time Voice Changers for Zoom [2022 List], Karen William, Sep. 10, 2021 (Updated Jul. 5, 2022), 8 pages.

(Continued)

*Primary Examiner* — Thjuan K Addy
(74) *Attorney, Agent, or Firm* — Young Basile Hanlon & MacFarlane, P.C.

(57) ABSTRACT

A portion of an audio stream representing speech of a conference participant is filtered based on a determination that the portion of the audio stream corresponds to a predefined sensitive topic. An audio stream representing speech of a user of a participant device connected to a conference is obtained. First hash values are determined for portions of the speech. A determination is made, by comparing the first hash values against second hash values for records of a data store, that a portion of the speech corresponds to a predefined sensitive topic indicated within the records. A filter is applied against the portion of the speech to produce a modified audio stream within which the predefined sensitive topic is sanitized. An output, within the conference, of the modified audio stream is then caused in place of the audio stream.

20 Claims, 10 Drawing Sheets

(56) References Cited

U.S. PATENT DOCUMENTS

| | | |
|---|---|---|
| 2016/0063097 A1 | 3/2016 | Brown et al. |
| 2022/0051652 A1 | 2/2022 | Winsvold et al. |
| 2022/0199102 A1 | 6/2022 | Ostrand et al. |
| 2023/0013497 A1 | 1/2023 | Aher et al. |
| 2023/0117129 A1 | 4/2023 | Mouline et al. |

OTHER PUBLICATIONS

Voicemod, Voice Changer for Video Calls: ZOOM, Hangouts, Facetime, Sep. 2022, 2 pages.

Accent Conversion using Pre-trained Model and Synthesized Data from Voice Conversion, Tuan Nam Nguyen, Ngoc Quan Pham, Alexander Waibel, Karlsruhe Institute of Technology and Carnegie Mellon University, Sep. 2022, 5 pages.

\* cited by examiner

FILTERING SENSITIVE TOPIC SPEECH WITHIN A CONFERENCE AUDIO STREAM

FIELD

This disclosure generally relates to audio stream modification, and, more specifically, to modifying an audio stream representing speech of a conference participant to filter a portion of the speech corresponding to a predefined sensitive topic.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
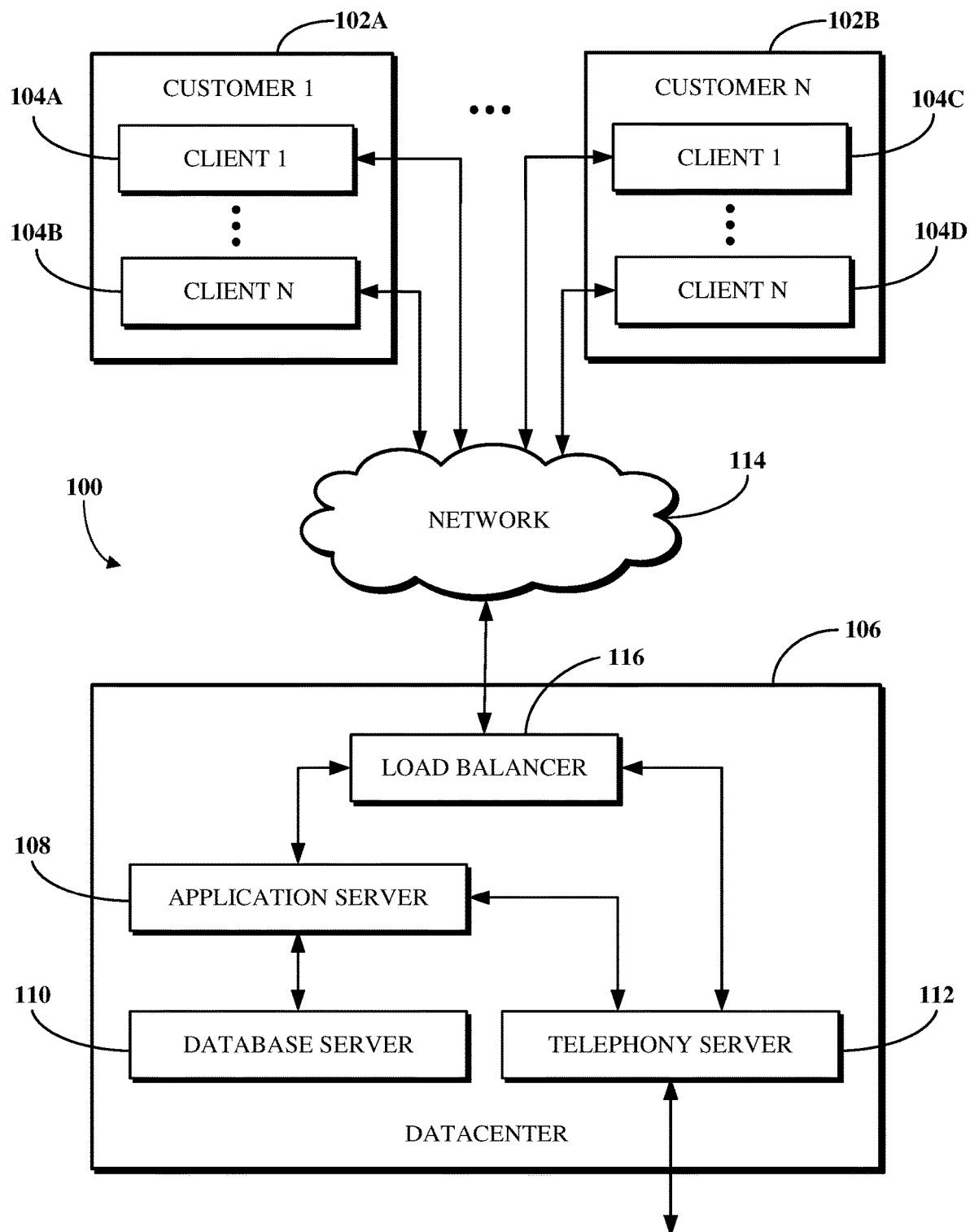
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Participants to an audio or video conference may discuss a variety of topics during a conference. The topics may be pre-planned, such as by their inclusion within an agenda for the conference, or spontaneous, such as arising from the discussion of a different topic or upon request by a conference participant. In either case, a topic may from time to time be a sensitive topic, for example, information that is confidential or otherwise private. For example, where a conference includes participants associated with multiple, unrelated entities (e.g., two different companies as parties at some stage of a sales transaction), a participant from one of the entities may unintentionally say something that is or relates to a topic which is sensitive to their entity and which should not be revealed to the participants of the other entity. This sensitive topic could, for example, be or otherwise relate to negotiation goals, project codenames, or financial details. However, conventional conferencing approaches do not have the capability to automatically detect references to such sensitive topics and modify audio from the subject participant to limit or prevent the exposure of those sensitive topic references to other participants within the conference.

Participants to an audio or video conference may also use certain language or speech styles that differ from that of other participants, such as based on their personality, public speaking skills, or familiarity with a given topic. In some cases, speech from a conference participant may be considered to include undesirable language. For example, while some participants may be eloquent speakers, others may frequently and unintentionally use filler phrases such as "uh" or "um" that might have the effect of diluting an otherwise valuable thought to share or be seen as a disruption to an otherwise steady conversation. In another example, some participants may regularly use profanity in their personal lives and unintentionally use some in a professional conference setting, which may be considered unpleasant or offensive by others and thus may cause the speaker to lose standing within the conference. However, conventional conferencing approaches do not have the capability to automatically detect the use of such undesirable language and modify audio from the subject participant to limit or prevent the exposure of that language to other participants within the conference.

Implementations of this disclosure address problems such as these by modifying audio streams representative of speech from a participant to an audio or video conference, in real-time during the conference and/or during a later playback of a recording of the conference. According to some implementations of this disclosure, a portion of an audio stream representing speech of a conference participant is filtered based on a determination that the portion of the audio stream corresponds to a predefined sensitive topic. An audio stream representing speech of a user of a participant device connected to a conference is obtained. Hash values are determined for portions of the speech. A determination is made, by comparing the hash values against hash values for records of a data store, that a portion of the speech corresponds to a predefined sensitive topic indicated within the records. A filter is applied against the portion of the speech to produce a modified audio stream within which the predefined sensitive topic is sanitized. An output, within the conference, of the modified audio stream is then caused in place of the audio stream. According to other implementations of this disclosure, a portion of speech represented in an audio stream of a conference participant is removed based on a determination that the portion of the speech corresponds to language identified as undesirable. An audio stream representing speech of a user of a participant device connected to a conference is obtained. The audio stream is processed to detect that a portion of the speech corresponds to language identified as undesirable within an audio profile. A modified audio stream is produced by removing the portion of the speech from the audio stream. An output, within the conference, of the modified audio stream is then played in place of the audio stream (e.g., by server-side or client-side software causing such output).

To describe some implementations in greater detail, reference is first made to examples of hardware and software structures used to implement a conference participant audio stream modification system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
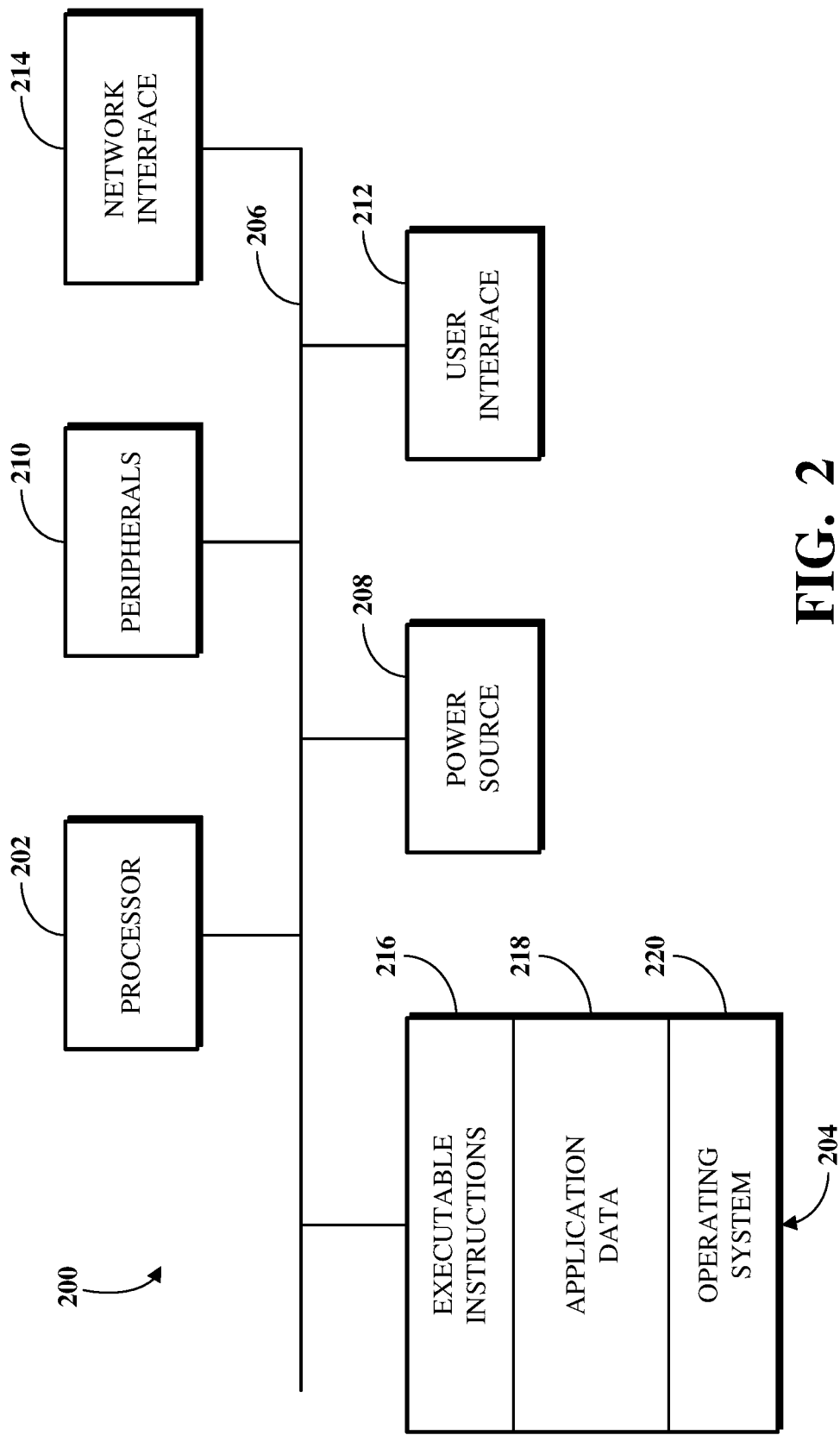
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
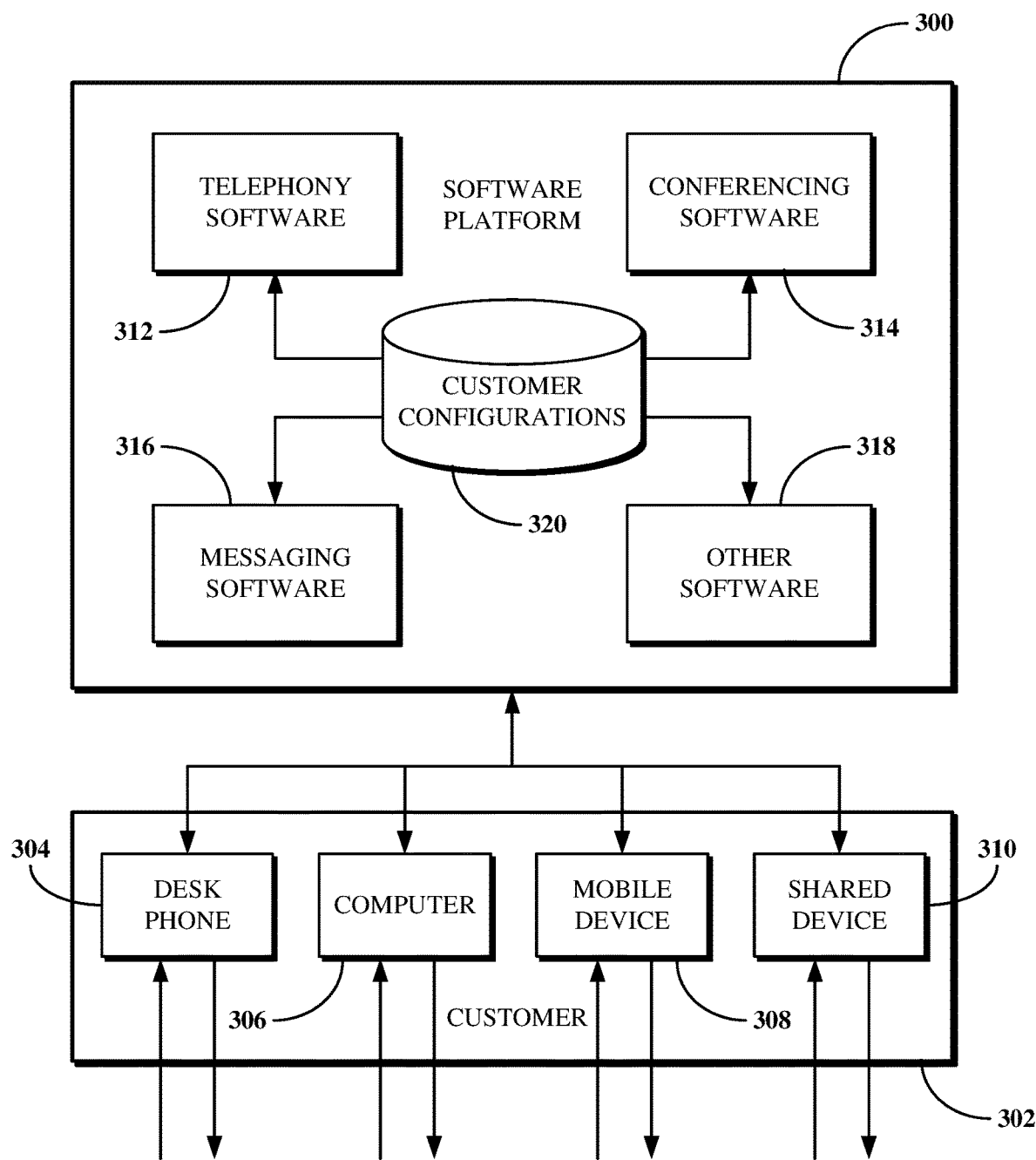
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for modifying audio streams representing speech of participants to a conference within the conference. In some such cases, the other software 318 may be or be included in the conferencing software 314.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
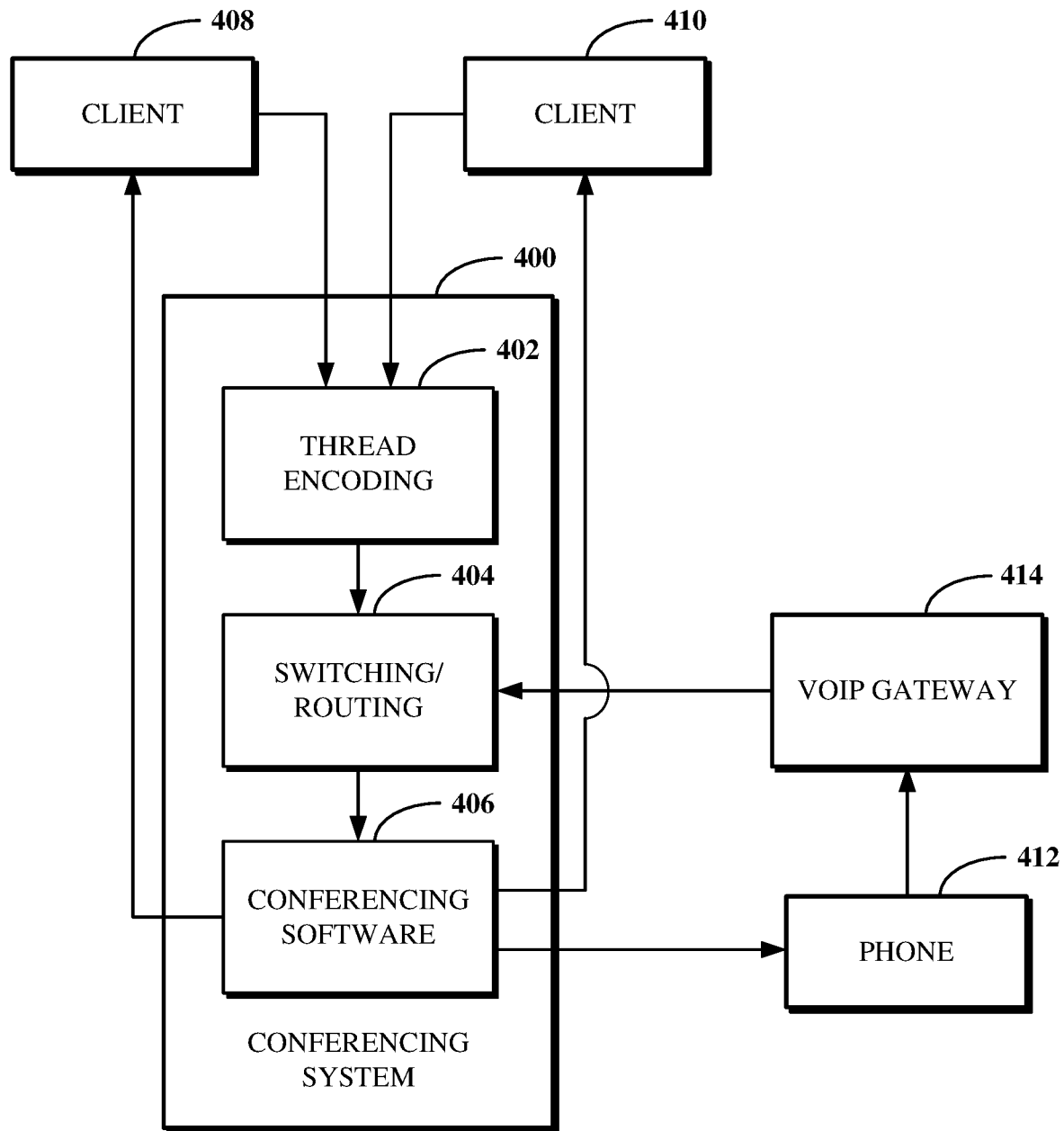
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, be the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients.

A user of the phone 412 participates in a conference using an audio-only connection and may be referred to as an audio-only caller. To participate in the conference from the phone 412, an audio stream from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio stream representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turn on their video stream for any portion of the conference. In some cases, however, the conference may have video disabled, such as where each participant connects to the conference using a phone rather than a client, or where a host of the conference selectively configures the conference to exclude video functionality.

In some implementations, other software services may be accessible in connection with a conference implemented using the conferencing system 400. For example, a conference may include or otherwise integrate functionality for instant messaging, unified messaging, and other types of messaging communications between participants of the conference, such as to facilitate a chat or like virtual conversation between participants. Those other software services may be implemented at the conferencing system 400 and/or a different aspect of the system 100.

Figure 5:
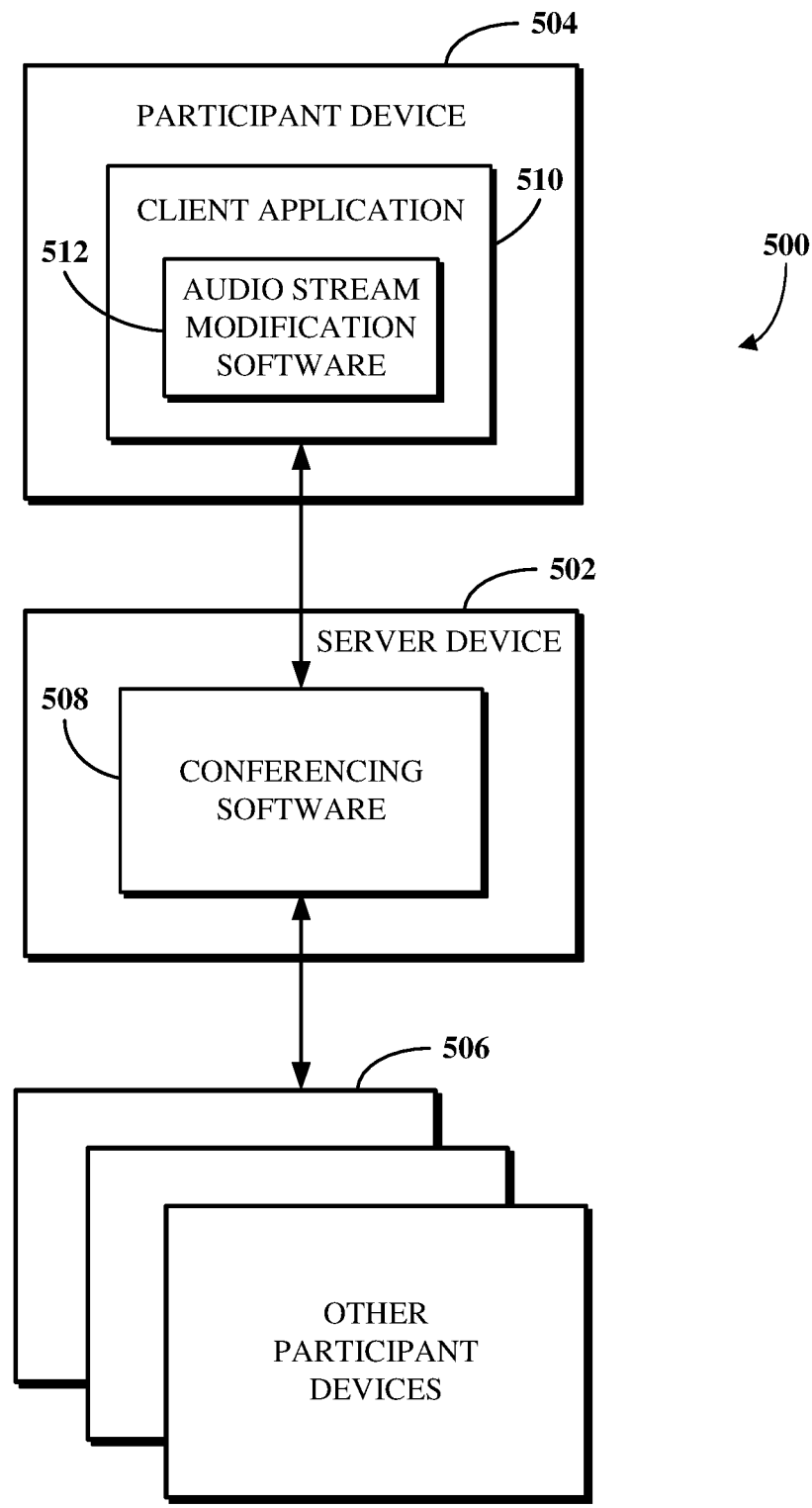
FIG. 5 is a block diagram of an example of a conference participant audio stream modification system.

FIG. 5 is a block diagram of an example of a conference participant audio stream modification system 500. The system 500 includes a server device 502, a participant device 504, and other participant devices 506. Each of the participant device 504 and the other participant devices 506 may, for example, be one of the clients 408 or 410. In some cases, one or more of the other participant devices 506 may be a phone, for example, the phone 412. The participant device 504 and the other participant devices 506 are used to connect to and participate in an audio or video conference implemented by conferencing software 508 at the server device 502. The conferencing software 508 may, for example, be the conferencing software 406.

The participant device 504 connects to the conferencing software 508 using a client application 510, which is a client-side software application running at the participant device 504. The client application 510 may, for example, be a desktop software application, mobile application, or web application associated with one or more services of a software platform, for example the software platform 300 shown in FIG. 3. The client application 510 may be software that allows a user of the participant device 504 to access or otherwise use one or more of the software 312 through 318 shown in FIG. 3. While not shown, at least some of the other participant devices 506 may also connect to the conference using a client application running at those ones of the other participant devices 506.

The client application 510 includes or otherwise uses audio stream modification software 512 for modifying an audio stream representing speech of the user of the participant device 504. In particular, the audio stream modification software 512 is configured to automatically detect and remediate the use of certain contents within speech of a participant to a conference (e.g., the user of the participant device 504). In one example, the audio stream modification software 512 automatically detects references to a sensitive topic within speech represented by an audio stream from a participant device (e.g., the participant device 504) and modifies the audio stream to limit or prevent the exposure of that sensitive topic to other participants within the conference (e.g., users of the other participant devices 506). In another example, the audio stream modification software 512 automatically detects the use of undesirable language within speech represented by an audio stream from a participant device (e.g., the participant device 504) and modifies the audio stream to limit or prevent the exposure of that undesirable language to other participants within the conference (e.g., users of the other participant devices 506). In either case, the automatic detection is in response to or otherwise based on the subject audio stream being obtained by the audio stream modification software 512.

References to an audio stream being modified and/or to a modified audio stream being output by the audio stream modification software 512 "within a conference" are non-limiting as to a time at which such modification and/or output occurs. In particular, the audio stream modification software 512 may modify an audio stream and output the modified audio stream during a conference (i.e., while the conference remains on-going) or during playback of a recording of the conference (i.e., after the conference has ended).

While the audio stream modification software 512 is shown and described as being included within the client application 510, in some implementations, the audio stream modification software 512 or a portion thereof may be external to the client application 510. For example, the audio stream modification software 512 may be implemented at the conferencing software 508. In another example, the audio stream modification software 512 may in some cases represent functionality of a software platform which includes the conferencing software 508 (e.g., the software platform 300) external to but otherwise for use with the conferencing software 508.

Figure 6:
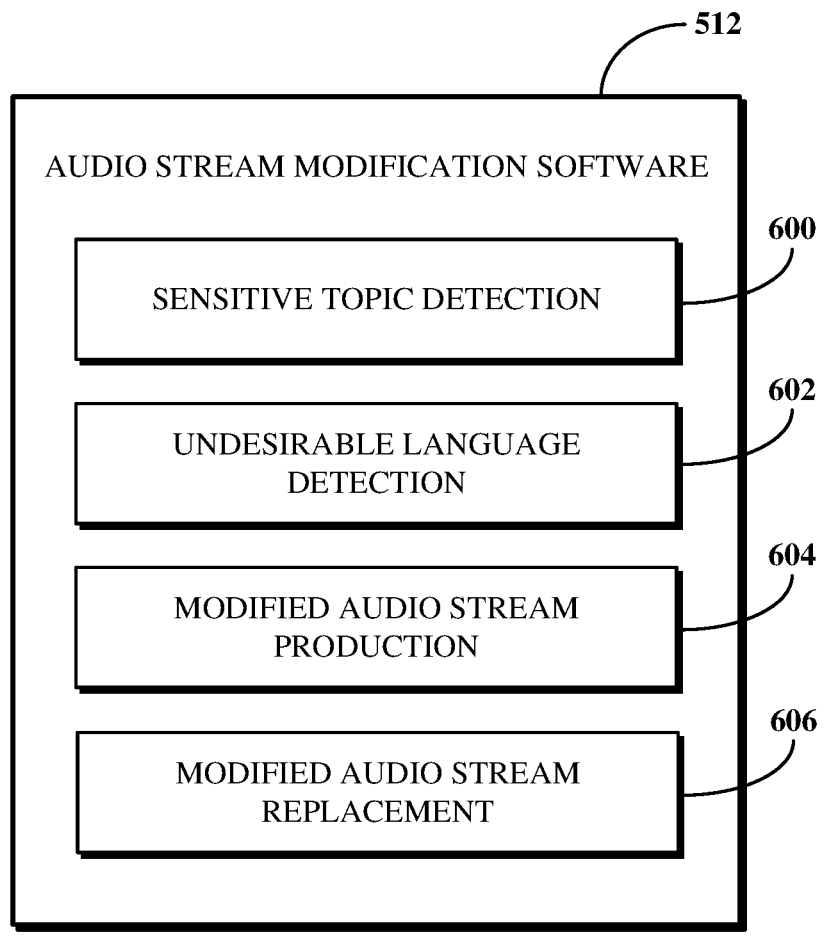
FIG. 6 is a block diagram of an example of functionality of audio stream modification software.

FIG. 6 is a block diagram of an example of functionality of the audio stream modification software 512. The audio stream modification software 512 includes tools, such as programs, subprograms, functions, routines, subroutines, operations, and/or the like, for modifying audio streams representing speech of participants to a conference within the conference. As shown, the audio stream modification software 512 includes a sensitive topic detection tool 600, an undesirable language detection tool 602, a modified audio stream production tool 604, and a modified audio stream replacement tool 606.

The sensitive topic detection tool 600 determines that a portion of speech represented within an audio stream from a participant device (e.g., the participant device on which the audio stream modification software 512 is running or a participant device connected to a server device on which the audio stream modification software 512 is running) corresponds to a predefined sensitive topic. The predefined sensitive topic is one of multiple predefined sensitive topics to which speech might correspond. The predefined sensitive topics are topics which have been identified as sensitive in nature before the conference in which the audio stream modification software 512 is used to modify a given audio stream, or at least before the subject audio stream modification occurs during the conference. Sensitive topics include confidential information, private information, secret information, or other information for which public disclosure is prohibited, restricted, or unwanted. Examples of sensitive topics include, without limitation, secretive business information (e.g., projects under internal development or sales figures), financial information (e.g., account balances or transaction references), and personal identity information (e.g., names or addresses). Topics may be identified as sensitive by or from one or more people or sources, including, without limitation, a user of a participant device, an administrator associated with an account or entity with which one or more participant devices are registered, or a person having other authority within that entity (e.g., a manager or supervisor).

Records indicative of the predefined sensitive topics are maintained in a predefined sensitive topics data store accessible to the audio stream modification software 512. The predefined sensitive topics data store may be under the control of an administrator associated with an account or entity with which one or more participant devices connected to a conference are associated. The administrator may, for example, add records to, modify records of, and/or delete records from the predefined sensitive topics data store according to changes in what topics are considered sensitive. For example, upon a new codename being created for a project under development by an entity, a record associated with that codename may be added to the predefined sensitive topics data store. In another example, upon a project associated with the codename being revealed to the public (e.g., during a product launch), a record associated with that codename may be removed from the predefined sensitive topics data store. In that sensitive topics are generally sensitive to multiple users (e.g., to an entire entity), the predefined sensitive topics data store may not be configured for control by individual users of participant devices.

A record within the predefined sensitive topics data store may include one or more hash values representative of the topic with which the record is associated. In particular, each hash value may correspond to a different semantic expression of that topic. For example, a record within the predefined sensitive topics data store may correspond to a company's contractual agreement with a business partner, Acme Holdings. A first hash value for the record may be created based on the expression "the Acme Holdings agreement," a second hash value may be created based on the expression "the agreement with Acme Holdings," a third hash value may be created based on the expression "the Acme contract," and so on. A hash value may be created by hashing audio input or text input representative of the subject expression. The hashing is performed according to a hash function such as Secure Hash Algorithm (SHA)-1, SHA-2, or SHA-3. In some cases, different expressions for a given sensitive topic may be manually provided for hashing, such as by an administrator. In some cases, different expressions for a given sensitive topic may be determined using a semantic neighborhood process, for example, using a K-nearest neighbor search process modeled based on semantic meanings of various words and/or using a machine learning model trained for semantic neighbor evaluation.

The sensitive topic detection tool 600 determines that a portion of speech represented within an audio stream from a participant device corresponds to a predefined sensitive topic by comparing hash values determined for portions of the speech represented within the audio stream against hash values for records of the predefined sensitive topics data store. In particular, upon obtaining an audio stream representing speech of a user of a participant device connected to a conference, the sensitive topic detection tool 600 determines first hash values for portions of the speech. A portion of the speech for which a first hash value is determined may be or include a single word, a combination of words, a partial phrase, a complete phrase, a partial sentence, or a complete sentence. The speech may, for example, be hashed in portions identified based on temporal chunks (e.g., 1 or 5 second intervals).

The first hash values are compared against second hash values for various records of the predefined sensitive topics data store, in which the terms "first" and "second" are used merely to explain that the hash values are of separate sets rather than implying an ordering or other relationship. The comparison is to determine whether any second hash value for a record of the predefined sensitive topics data store matches any first hash value. In some cases, all hash values for all records of the predefined sensitive topics data store may be searched in some search order until the earlier to occur of a hash value matching one of the first hash values is identified or a determination is made that no hash value within the predefined sensitive topics data store matches any of the first hash values. Thus, where a match is found between one of the first hash values and one of the second hash values, the sensitive topic detection tool 600 outputs an indication of that match. In such a case, a sensitive topic is detected in the speech represented within the audio stream. However, where a match is not found between any of the first hash values and any of the second hash values, the sensitive topic detection tool 600 outputs an indication that no match was found. In such a case, a sensitive topic is not detected in the speech represented within the audio stream.

The sensitive topic detection tool 600 is generally configured to determine that a portion of the speech represented within an audio stream corresponds to a predefined sensitive topic regardless of who the participants to the subject conference are. However, in some implementations, the sensitive topic detection tool 600 may be configured to determine that a portion of the speech represented within an audio stream corresponds to a predefined sensitive topic based on there being at least two different domains (e.g., domain names for registered email addresses) for user accounts associated with users of participant devices connected to a subject conference. For example, where all user accounts associated with the users of the participant devices are common to a same domain (e.g., "examplecompany-.com"), the sensitive topic detection tool 600 may be disabled or otherwise unused based on the premise that there is no risk of exposure of sensitive topic information to others outside of that domain within the conference. In some implementations, the sensitive topic detection tool 600 may be configured to determine that a portion of the speech represented within an audio stream corresponds to a predefined sensitive topic based on a social graph or organization chart for an entity with which the user of the participant device from which the audio stream is obtained is associated. For example, the sensitive topic detection tool 600 may be configured to determine that a portion of the speech represented within an audio stream corresponds to a predefined sensitive topic where an organization chart indicates that participants to the subject conference are from separate teams even within a single entity (i.e., such that the participants likely share a common domain) which operate under a strict policy against sharing certain work information.

In some implementations, the sensitive topic detection tool 600 determines that a portion of speech represented within an audio stream from a participant device corresponds to a predefined sensitive topic other than based on a hash value comparison. For example, the sensitive topic detection tool 600 can perform text conversion to convert a portion of speech represented within an audio stream from a participant device into text. The sensitive topic detection tool 600 can then compare the text against text of records of the predefined sensitive topic data store, which each include text representative of various predefined sensitive topics (e.g., including various semantic meaning versions thereof). A determination that the portion of the speech corresponds to a predefined topic may thus be made based on a match between the text produced by the text conversion and text of a record of the predefined sensitive topic data store.

The undesirable language detection tool 602 determines that a portion of speech represented within an audio stream from a participant device (e.g., the participant device on which the audio stream modification software 512 is running or a participant device connected to a server device on which the audio stream modification software 512 is running) corresponds to language identified as undesirable. In particular, the undesirable language detection tool 602 determines that the portion of the speech corresponds to language identified as undesirable within an audio profile. The audio profile is or includes records of language spoken by one or more participant device users in one or more past conferences. For example, the audio profile may correspond to the user of the participant device from which the audio stream is obtained, in which case the audio profile includes records identifying, as undesirable, language spoken by the user of the participant device in one or more past conferences. In another example, the audio profile may correspond to an entity with which the user of the participant device from which the audio stream is obtained is associated, in which case the audio profile includes records identifying, as undesirable, language spoken by one or more users of participant devices associated with the entity in one or more past conferences. Language may be identified or marked for identification as being undesirable by or from one or more people or sources, including, without limitation, a user of a participant device, an administrator associated with an account or entity with which one or more participant devices are registered, or a person having other authority within that entity (e.g., a manager or supervisor).

Generally, undesirable language is language which is undesirable to speak in a professional conference setting. Examples of undesirable language may include, without limitation, profanity, filler words, or phrases which would be considered offensive to one or more groups of people. The quality of language being undesirable may be with reference to the speaker of the language or a recipient of the language, and thus language may be considered undesirable by a speaker and/or a recipient. Because the types of words or phrases which may qualify as undesirable language may differ between countries or regions or the world, the detection of undesirable language by the undesirable language detection tool 602 is based on vernacular rather than an assumed global meaning for certain words or phrases. The audio profile which is used to determine that portions of speech correspond to language identified as undesirable thus may be specific to a location in which the user or users of the participant device is or are located.

In particular, the audio profile may identify language frequently used by the user or users in one or more past conferences along with an indication of whether the language is undesirable. In some cases, the audio profile may identify language not used in a past conference but which is still considered undesirable, such as profanity, disparaging words or phrases, or words or phrases commonly recognized as relating to unwanted advances or innuendos. In some cases, the audio profile may only include language identified as undesirable. Language may be identified as undesirable within the audio profile based on manual user input indicating that the language is undesirable language. For example, a user of a participant device (i.e., the participant device from which the audio stream processed by the undesirable language detection tool 602 is processed or another participant device) may receive a prompt from the audio stream modification software 512 asking the user to verify whether a given word or phrase qualifies as undesirable language (e.g., based on the language being unpleasant, offensive, disruptive, or an annoyance). In another example, a machine learning model may be trained to recognize words or phrases which may qualify as undesirable language based on patterns extrapolated from a labeled training data set indicating words or phrases that do or do not qualify as undesirable language.

Similar to the processing described above by the sensitive topic detection tool 600, each element of language within the audio profile may include a hash value created by hashing audio input or text input representative of the subject language. The hashing is performed according to a hash function such as SHA-1, SHA-2, or SHA-3. The undesirable language detection tool 602 determines that a portion of speech represented within an audio stream from a participant device corresponds to language identified as undesirable within an audio profile by comparing hash values determined for portions of the speech represented within the audio stream against hash values for elements of language (i.e., different words or phrases) within the audio profile. In particular, upon obtaining an audio stream representing speech of a user of a participant device connected to a conference, the undesirable language detection tool 602 determines first hash values for portions of the speech. A portion of the speech for which a first hash value is determined may be or include a single word, a combination of words, a partial phrase, a complete phrase, a partial sentence, or a complete sentence. The speech may, for example, be hashed in portions identified based on temporal chunks (e.g., 1 or 5 second intervals).

The first hash values are compared against second hash values for elements of language within the audio profile, in which, as with the sensitive topics described above, the terms "first" and "second" are used merely to explain that the hash values are of separate sets rather than implying an ordering or other relationship. The comparison is to determine whether any second hash value for language identified as undesirable within the audio profile matches any first hash value. In some cases, all hash values for all elements of language within the audio profile may be searched in some search order until the earlier to occur of a hash value matching one of the first hash values is identified or a determination is made that no hash value within the audio profile matches any of the first hash values. Thus, where a match is found between one of the first hash values and one of the second hash values, the undesirable language detection tool 602 outputs an indication of that match. In such a case, undesirable language is detected in the speech represented within the audio stream. However, where a match is not found between any of the first hash values and any of the second hash values, the undesirable language detection tool 602 outputs an indication that no match was found. In such a case, undesirable language is not detected in the speech represented within the audio stream.

The undesirable language detection tool 602 is generally configured to determine that a portion of the speech represented within an audio stream corresponds to language identified as undesirable regardless of who the participants to the subject conference are. However, in some implementations, the undesirable language detection tool 602 may be configured to determine that a portion of the speech represented within an audio stream corresponds to language identified as undesirable based on there being at least two different domains (e.g., domain names for registered email addresses) for user accounts associated with users of participant devices connected to a subject conference. For example, where all user accounts associated with the users of the participant devices are common to a same domain (e.g., "examplecompany.com"), the undesirable language detection tool 602 may be disabled or otherwise unused based on the premise that there is no risk of exposure of undesirable language to others outside of that domain within the conference.

In some implementations, the undesirable language detection tool 602 determines that a portion of speech represented within an audio stream from a participant device corresponds to language identified as undesirable other than based on a hash value comparison. For example, the undesirable language detection tool 602 can perform text conversion to convert a portion of speech represented within an audio stream from a participant device into text. The undesirable language detection tool 602 can then compare the text against text of an audio profile, in which the text of the audio profile represents various undesirable language (e.g., including various semantic meaning versions thereof). A determination that the portion of the speech corresponds to language identified as undesirable may thus be made based on a match between the text produced by the text conversion and text of the audio profile.

In some implementations, the audio profile may omit language associated with one or more conference participant names that otherwise phonetically similar to undesirable language. For example, a conference participant may have a name which sounds like language otherwise identified as undesirable within the audio profile. In such a case, the participant device user associated with the audio profile may be prompted to verify whether the name, given its use in a past conference, should be identified as undesirable language within the audio profile. In another example, language added to the audio profile based on such a participant name may be automatically removed from the audio profile based on a determination that the name is phonetically similar to language otherwise recognized as undesirable.

The modified audio stream production tool 604 produces a modified audio stream according to the output from the sensitive topic detection tool 600, the undesirable language detection tool 602, or both. In particular, the modified audio stream production tool 604 causes a filtering (e.g., a removal or obfuscation) of the portion of the speech detected, by the sensitive topic detection tool 600 or the undesirable language detection tool 602, respectively, as corresponding to a predefined sensitive topic or to language identified as undesirable. For example, the modified audio stream production tool 604 can apply a filter against the portion of the speech to produce a modified audio stream within which the predefined sensitive topic or the undesirable language is filtered. In another example, the modified audio stream production tool 604 can produce a modified audio stream by removing the portion of the speech from the audio stream. In one non-limiting example, filtering the predefined sensitive topic or the undesirable language within or removing the predefined sensitive topic or the undesirable language from the audio stream can include obfuscating the portion of the speech. In such a case, the filter may be or include some configuration for distorting targeted portions of the speech.

The modified audio stream replacement tool 606 causes an output, within the conference, of the modified audio stream produced by the modified audio stream production tool 606 in place of the audio stream originally obtained from the subject participant device. Generally, the modified audio stream is output at each participant device connected to the conference. However, in some implementations, the modified audio stream may be output at some, but not all, of the participant devices connected to the conference. For example, the modified audio stream may be output only at participant devices at which user accounts of the users have a domain different from a domain of the user account associated with the participant device from which the audio stream is obtained. In such a case, the modified audio stream may be output at a first group of participant devices while the original audio stream (i.e., without modification) may be output at a second group of participant devices.

The operation of the audio stream modification software 512 is generally with respect to an ongoing conference. Thus, in the examples described above, the modification of an audio stream using the audio stream modification software 512 and thus the production of the modified audio stream is described as occurring during the conference and therefore while the conference remains ongoing. However, in some implementations, the audio stream modification software 512 may operate against a recording of the playback and thus the modified audio stream may be produced during playback of a recording of the conference. In such a case, the audio stream modification is performed at a device at which the recording of the conference is being played back. In some such cases, the production of the modified audio stream and/or the processing by the sensitive topic detection tool 600 and/or the undesirable language detection tool 602 may be based on the device at which the recording of the conference is being played corresponding to a domain different from that of a participant device from which a given audio stream output during the recording playback was obtained within the conference.

Although the tools 600 through 606 are shown as separate tools, in some implementations, two or more of the tools 600 through 606 may be combined into a single tool. Although the tools 600 through 606 are shown as functionality of the audio stream modification software 512 as a single piece of software, in some implementations, some or all of the tools 600 through 606 may exist outside of the audio stream modification software 512. Similarly, in some implementations, a software service using the audio stream modification software 512 (e.g., the conferencing software 508) may exclude the audio stream modification software 512 while still including the some or all of tools 600 through 606 in some form elsewhere or otherwise make use of the tools 600 through 606 while some or all of the tools 600 through 606 are included in some form elsewhere.

While the audio stream modification software 512 is shown and described herein as being run at a participant device (e.g., as part of the client application 510), in some implementations, the audio stream modification software 512 or a portion thereof may be run other than at a participant device. For example, the audio stream modification software 512 may be wholly or partially run at the server device 502. In such a case, the obtaining of an audio stream is by the audio stream modification software 512 running at the server device 502 from the client application 510 running at the participant device 502, rather than by the audio stream modification software 512 running at the participant device 504 from the client application 510. Similarly, in such a case, the causing of an output of the modified audio stream within the conference describes the audio stream modification software 512 running at the server device 502 causing a participant device which receives the modified audio stream (e.g., one of the other participant devices 506) to output the modified audio stream during the conference, rather than the audio stream modification software 512 running at the participant device 504 from which the audio stream derived causing the output based on the client application 510 transmitting the modified audio stream to the server device 502 for distribution by the conferencing software 508.

Figure 7:
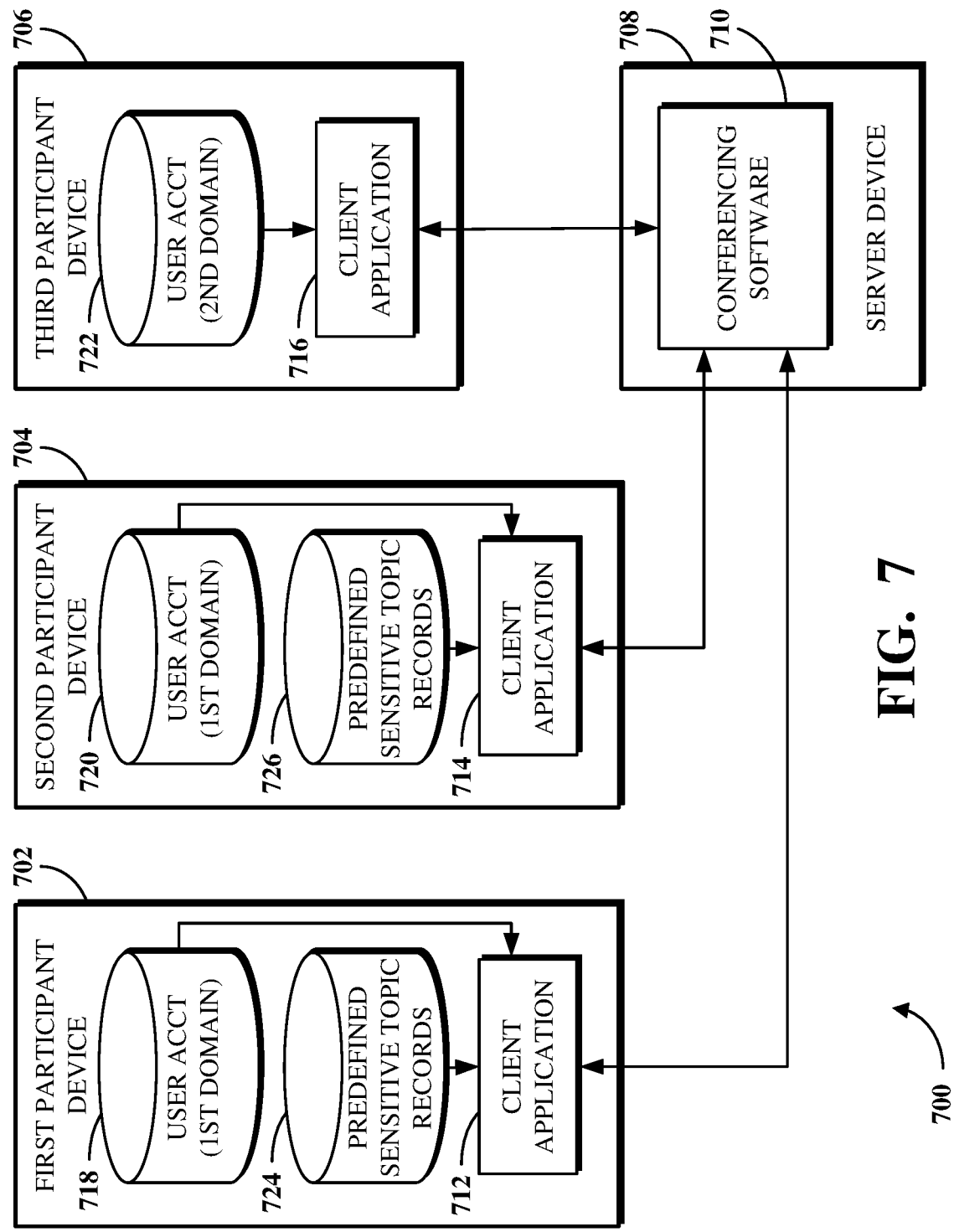
FIG. 7 is a block diagram of an example of a system for filtering sensitive topic speech within a conference audio stream.

FIG. 7 is a block diagram of an example of a system 700 for filtering sensitive topic speech within a conference audio stream. The system 700 includes a first participant device 702, a second participant device 704, a third participant device 706, and a server device 708. The server device 708 runs conferencing software 710 for implementing an audio or video conference. The participant devices 702 through 706 connect to the conference implemented by the conferencing software 710 respectively using a client application 712, a client application 714, and a client application 716. The first participant device 702 may, for example, be the participant device 504, in which case the client application 712 may be the client application 510. The second participant device 704 and the third participant device 706 may, for example, be the other participant devices 506. The server device 708 may, for example, be the server device 502, in which case the conferencing software 710 may be the conferencing software 508.

The participants to the conference are associated with multiple domains. In particular, as shown, the first participant device 702 has a user account 718 associated with a first domain, the second participant device 704 has a user account 720 also associated with the domain, and the third participant device 706 has a user account 722 associated with a second domain. The first participant device 702 and the second participant device 704, both being associated with the first domain, have a predefined sensitive topic data store stored thereat. In particular, a data store 724 is stored at the first participant device 702 and a data store 726 is stored at the second participant device 704. The data store 724 and the data store 726 are identical and may, for example, be copies of a predefined sensitive topic data store maintained by an administrator associated with the first domain. For example, the administrator may cause changes to the predefined sensitive topic data store at their own device to be pushed as updates to the data store 724 and to the data store 726.

During the conference to which each of the first participant device 702, the second participant device 704, and the third participant device 706 are connected, the client application 712 (e.g., using audio stream modification software running thereat, such as the audio stream modification software 512) processes an audio stream from the first participant device 702 (e.g., produced based on input captured using a microphone of the first participant device 702) to determine to modify the audio stream to filter sensitive topic speech therein. In particular, based on a determination that the third participant device 706 corresponds to the second domain and thus not the first domain to which the first participant device 702 corresponds, the client application 712 hashes portions of the speech represented within the audio stream and compares those resulting hash values against hash values for records of the data store 724. For example, the client application 712 may have direct visibility into domains associated with participant devices connected to the conference. In another example, indications of domains with which the participant devices are associated may be transmitted to the client application 712 from the conferencing software 710. Upon a match being determined based on that comparison, the client application 712 modifies the audio stream to filter the predefined sensitive topic determined to correspond to a portion of the speech. The second participant device 704 and the third participant device 706 obtain the modified audio speech, which is output at those devices.

However, where the third participant device 706 is omitted and thus not connected to the conference, a determination may instead be made by the client application 712 (e.g., by the audio stream modification software running thereat) that all participant devices connected to the conference are of the first domain. In such a case, the client application 712 may forego modifying the audio stream from the first participant device 702, notwithstanding that the audio stream may include speech which corresponds to a sensitive topic. This is because the exposure of that sensitive topic to other participant device users also of the same domain as the user of the first participant device 702 would not pose a risk with respect to the sensitive topic being disclosed outside of a common entity.

While the audio stream modification functionality of the system 700 is described with respect to the client application 712 and thus as participant device-side functionality, in some implementations, the audio stream modification functionality of the system 700 may be server-side functionality and thus present at the server device 708. For example, the server device 708 may include audio stream modification software (e.g., as part of the conferencing software 710) which obtains audio streams from each of the first participant device 702, the second participant device 704, and the third participant device 706 and which produces and causes outputs of a modified audio stream at those participant devices as described above.

Figure 8:
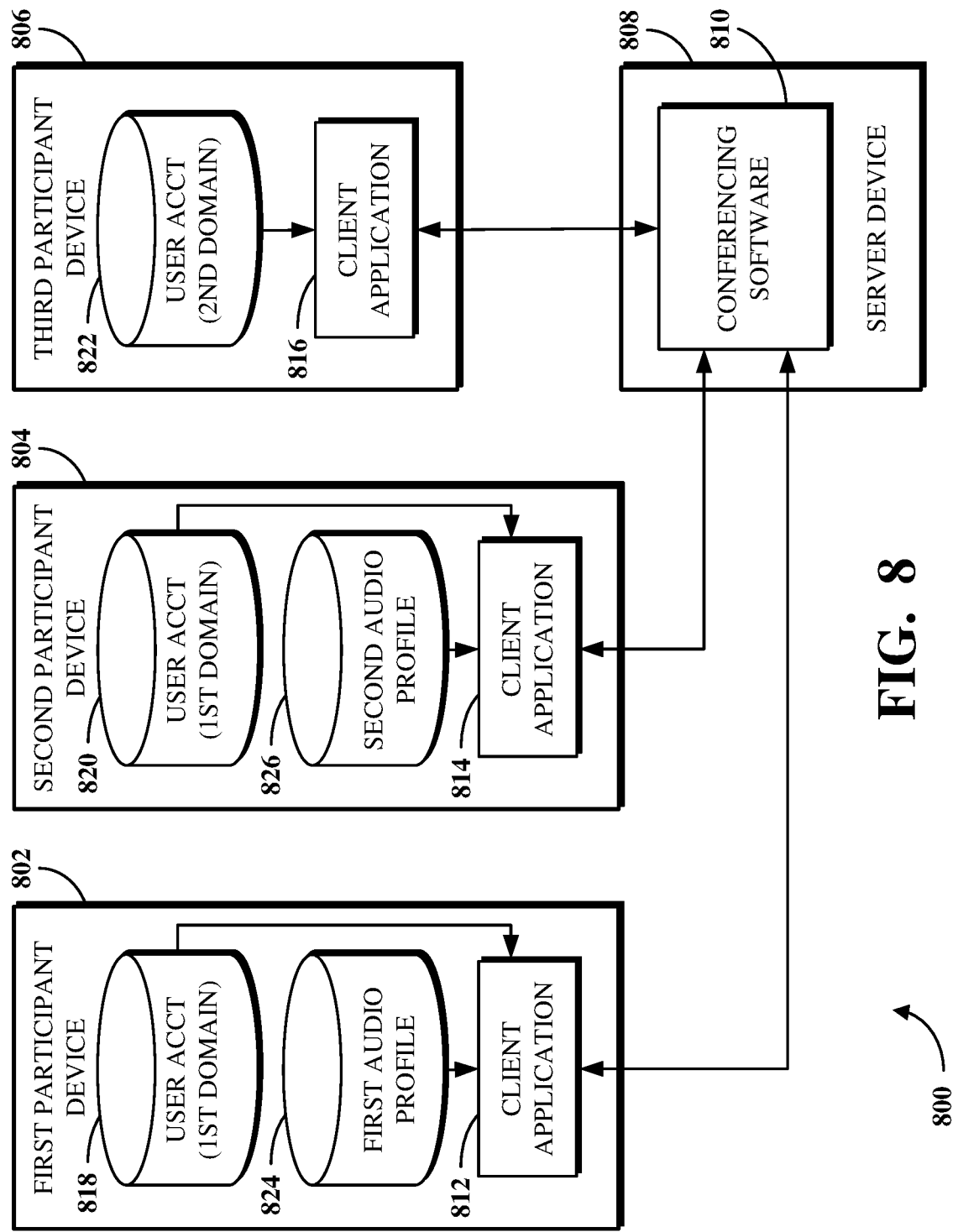
FIG. 8 is a block diagram of an example of a system for removing undesirable speech from within a conference audio stream.

FIG. 8 is a block diagram of an example of a system 800 for removing undesirable speech from within a conference audio stream. The system 800 includes a first participant device 802, a second participant device 804, a third participant device 806, and a server device 808. The server device 808 runs conferencing software 810 for implementing an audio or video conference. The participant devices 802 through 806 connect to the conference implemented by the conferencing software 810 respectively using a client application 812, a client application 814, and a client application 816. The first participant device 802 may, for example, be the participant device 504, in which case the client application 812 may be the client application 510. The second participant device 804 and the third participant device 806 may, for example, be the other participant devices 506. The server device 808 may, for example, be the server device 502, in which case the conferencing software 810 may be the conferencing software 508.

The participants to the conference are associated with multiple domains. In particular, as shown and as with the system 700, the first participant device 802 has a user account 818 associated with a first domain, the second participant device 804 has a user account 820 also associated with the domain, and the third participant device 806 has a user account 822 associated with a second domain. The first participant device 802 and the second participant device 804 each has an audio profile stored thereat. In particular, the first participant device 802 includes or otherwise accesses a first audio profile 824 and the second participant device 804 includes or otherwise accesses a second audio profile 826. The first audio profile 824 is specific to the user of the first participant device 802 and thus includes elements of language used by the user of the first participant device 802. The second audio profile 826 is specific to the user of the second participant device 804 and thus includes elements of language used by the user of the second participant device 804. For example, the user of the first participant device 802 may have control over the contents of the first audio profile 824 and the user of the second participant device 804 may have control over the contents of the second audio profile 826.

During the conference to which each of the first participant device 802, the second participant device 804, and the third participant device 806 are connected, the client application 812 (e.g., using audio stream modification software running thereat, such as the audio stream modification software 512) processes an audio stream from the first participant device 802 (e.g., produced based on input captured using a microphone of the first participant device 802) to determine to modify the audio stream to remove undesirable language therefrom. In particular, based on a determination that the third participant device 806 corresponds to the second domain and thus not the first domain to which the first participant device 802 corresponds, the client application 812 hashes portions of the speech represented within the audio stream and compares those resulting hash values against hash values for elements of language within the first audio profile 824. For example, and as with the system 700, the client application 812 may have direct visibility into domains associated with participant devices connected to the conference, or indications of domains with which the participant devices are associated may be transmitted to the client application 812 from the conferencing software 810. Upon a match being determined based on that comparison such that a portion of the speech represented within the audio stream is determined to correspond to language identified as undesirable within the first audio profile 824, the client application 812 modifies the audio stream to remove the undesirable language determined to correspond to a portion of the speech. The second participant device 804 and the third participant device 806 obtain the modified audio speech, which is output at those devices.

However, where the third participant device 806 is omitted and thus not connected to the conference, a determination may instead be made by the client application 812 (e.g., by the audio stream modification software running thereat) that all participant devices connected to the conference are of the first domain. In such a case, the client application 812 may forego modifying the audio stream from the first participant device 802, notwithstanding that the audio stream may include speech which corresponds to language identified as undesirable within the first audio profile 824. This is because the exposure of that undesirable language to other participant device users also of the same domain as the user of the first participant device 702 would not pose a same risk of harm as may result from the exposure of that undesirable language to a participant device user outside of that same domain.

While the audio stream modification functionality of the system 800 is described with respect to the client application 812 and thus as participant device-side functionality, in some implementations, the audio stream modification functionality of the system 800 may be server-side functionality and thus be present at the server device 808. For example, the server device 808 may include audio stream modification software (e.g., as part of the conferencing software 810) which obtains audio streams from each of the first participant device 802, the second participant device 804, and the third participant device 806 and which produces and causes outputs of a modified audio stream at those participant devices as described above.

Figure 9:
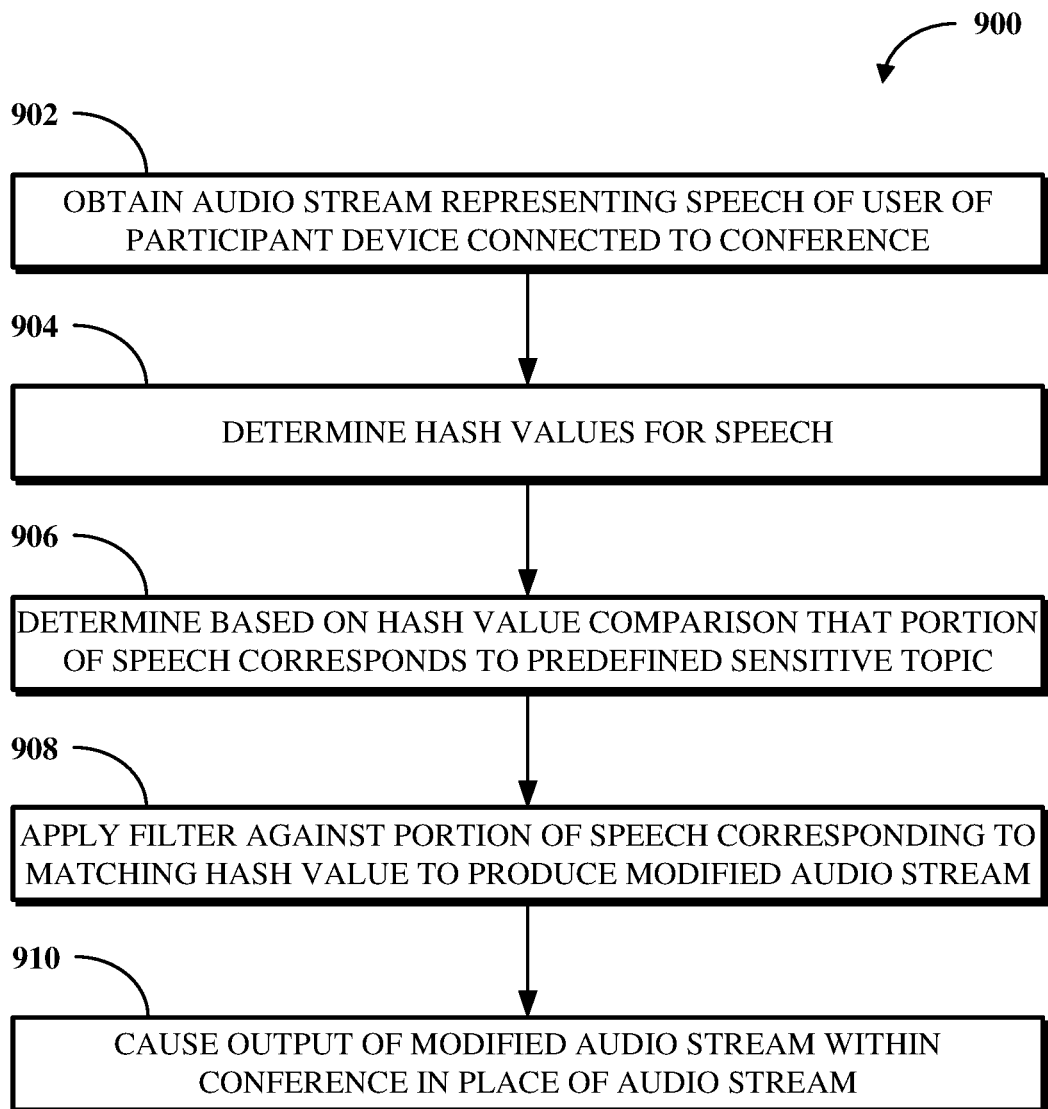
FIG. 9 is a flowchart of an example of a technique for filtering sensitive topic speech within a conference audio stream.
Figure 10:
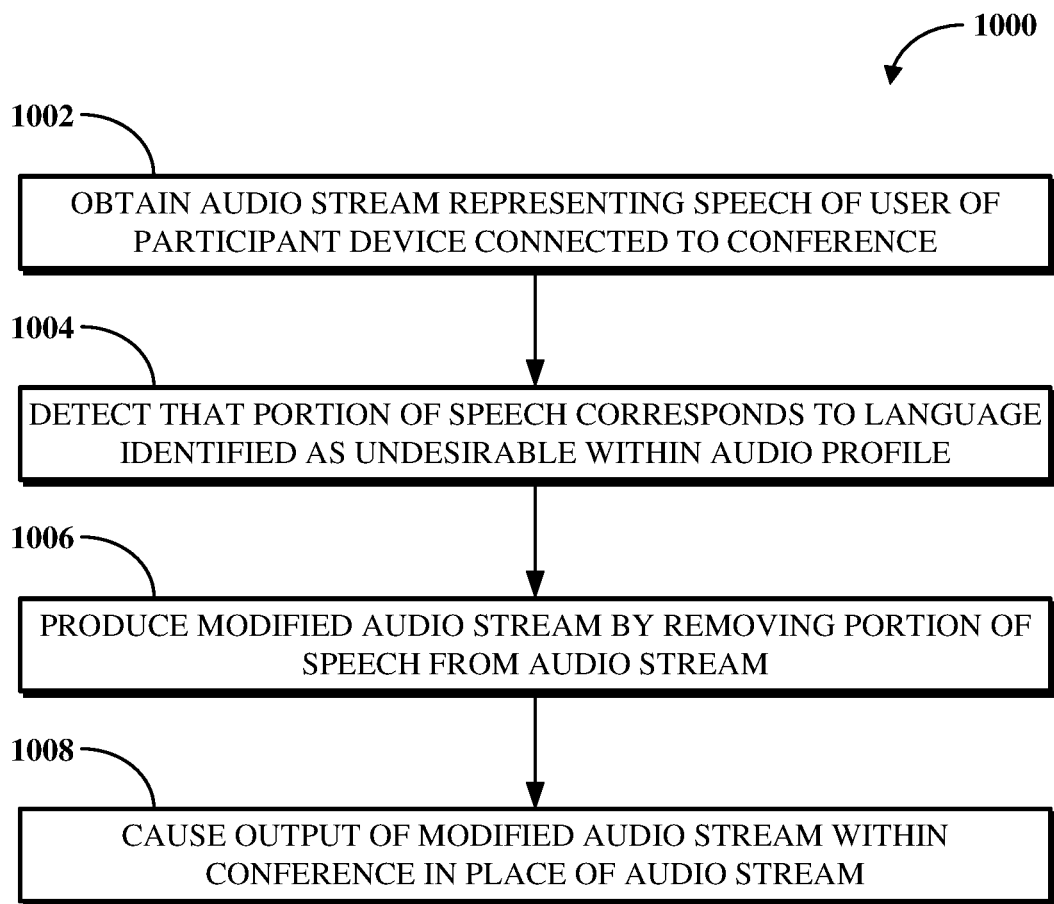
FIG. 10 is a flowchart of an example of a technique for removing undesirable speech from within a conference audio stream.

To further describe some implementations in greater detail, reference is next made to examples of techniques which may be performed by or using a conference participant audio stream modification system. FIG. 9 is a flowchart of an example of a technique 900 for filtering sensitive topic speech within a conference audio stream. FIG. 10 is a flowchart of an example of a technique 1000 for removing undesirable speech from within a conference audio stream.

The technique 900 and/or the technique 1000 can be executed using computing devices, such as the systems, hardware, and software described with respect to FIGS. 1-8. In one example, the technique 900 may be performed at a server device, such as the server device 502. In another example, the technique 900 may be performed at a client device, such as the participant device 504. The technique 900 and/or the technique 1000 can be performed, for example, by executing a machine-readable program or other computer-executable instructions, such as routines, instructions, programs, or other code. The steps, or operations, of the technique 900 and/or the technique 1000, or another technique, method, process, or algorithm described in connection with the implementations disclosed herein can be implemented directly in hardware, firmware, software executed by hardware, circuitry, or a combination thereof.

For simplicity of explanation, the technique 900 and the technique 1000 are each depicted and described herein as a series of steps or operations. However, the steps or operations of the technique 900 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 9, the technique 900 for filtering sensitive topic speech within a conference audio stream is shown. At 902, an audio stream is obtained from a participant device connected to a conference. The audio stream represents speech of a user of the participant device. The conference may, for example, be an audio conference or a video conference. In at least some cases, the conference may be implemented by a UCaaS or other software platform.

At 904, hash values are determined for portions of the speech. The hash values determined for the portions of the speech, referred to as first hash values, are determined on a temporal basis (e.g., a time chunk of the audio stream) or spatial basis (e.g., for a single word, a combination of words, or a complete clause, phrase, or sentence). Determining the first hash values includes computing the hash values based on the content of the portions of the speech, for example, using a hashing algorithm such as SHA-1, SHA-2, or SHA-3.

At 906, a determination is made based on a hash value comparison that a portion of the speech corresponds to a predefined sensitive topic. In particular, the first hash values are compared against second hash values for records of a data store, such as a predefined sensitive topic data store, to determine whether there is a match between any of the first hash values and any of the second hash values. For example, the records of the data store may be populated by an entity having a domain with which a conference user account used at the participant device is associated. Each record of the data store may indicate a different predefined sensitive topic. A determination is made that a portion of the speech corresponds to a predefined sensitive topic based on a first hash value corresponding to that portion of the speech matching a second hash value corresponding to a record for that predefined sensitive topic within the predefined sensitive topic data store. In non-limiting examples, the predefined sensitive topic may relate to confidential information or a codename.

At 908, a filter is applied against the portion of the speech corresponding to the matching hash value to produce a modified audio stream within which the predefined sensitive topic is sanitized (e.g., omitted, obfuscated, or otherwise replaced). The filter includes data or other configurations for modifying the audio stream, specifically, the portion of the speech within the audio stream. In some cases, the application of the filter causes an omission of the portion of the speech from within the modified audio stream. In other cases, the application of the filter causes an obfuscation of the portion of the speech from within the modified audio stream. In still other cases, the application of the filter causes a replacement of the portion of the speech from within the modified audio stream with other audible content. Portions of the speech other than the portion of the speech remain unfiltered within the modified audio stream.

At 910, the output of the modified audio stream is caused in place of the audio stream (i.e., as originally obtained from the participant device above). For example, causing the output of the modified audio stream in place of the audio stream can include causing the modified audio stream to be output at one or more participant devices connected to the conference based on conference user accounts used at the one or more participant devices corresponding other than to a domain associated with a conference user account used at the participant device from which the audio stream is obtained. In another example, causing the output of the modified audio stream in place of the audio stream can include transmitting the modified audio stream to one or more participant devices connected to the conference to cause the modified audio stream to be output at the one or more participant devices. Thus, the modified audio stream is output at all participant devices connected to the conference. Alternatively, the modified audio stream may be output at a limited number of participant devices connected to the conference. In one example, the modified audio stream may be output only at participant devices other than the one from which the audio stream is obtained. In another example, the modified audio stream may be output only at a subset of participant devices connected to the conference based on user accounts used at the subset of participant devices to access the conference having a domain that is different from a domain of the user account used at the participant device from which the audio stream is obtained.

In some implementations, the technique 900 can include determining to compare the first hash values against the second hash values based on a mismatch between a first domain associated with a first conference user account used at the participant device and a second domain associated with a second conference user account used at another participant device connected to the conference. In some implementations, the technique 900 can include determining to apply the filter against the portion of the speech based on a mismatch between a first domain associated with a first conference user account used at the participant device and a second domain associated with a second conference user account used at another participant device connected to the conference. In some implementations, a control policy restricts users of participant devices connected to the conference from altering the records of the data store. In some implementations, a record of the data store is removed from the data store upon a public disclosure of an associated predefined sensitive topic.

In some implementations, the technique 900 may include converting the portion of the speech into text and comparing the text against text of records of a predefined sensitive topic data store to determine that the portion of the speech corresponds to a predefined sensitive topic. In at least some such cases, operations related to hashing may be omitted from the technique 900.

Referring next to FIG. 10, the technique 1000 for removing undesirable speech within a conference audio stream is shown. At 1002, an audio stream is obtained from a first participant device connected to a conference. The audio stream represents speech of a user of the participant device. The conference may, for example, be an audio conference or a video conference. In at least some cases, the conference may be implemented by a UCaaS or other software platform.

At 1004, a portion of the speech is detected as corresponding to language identified as undesirable within an audio profile. In some cases, the audio profile corresponds to the user of the participant device and identifies, as undesirable, a plurality of language spoken by the user of the participant device in one or more past conferences. For example, in some such cases, the audio profile is configured by the user to identify select language as undesirable. In some cases, the audio profile corresponds to an entity with which the user of the participant is associated and identifies, as undesirable, a plurality of language spoken by one or more participant device users associated with the entity in one or more past conferences. The audio profile may in at least some cases be stored at the participant device from which the audio stream is obtained. The audio profile may be updated by an administrator of a user account of the user of the participant device.

Detecting that the portion of the speech corresponds to language identified as undesirable within the audio profile can include determining a hash value for the portion of the speech and comparing the hash value against hash values of the audio profile. For example, hash values may be determined for portions of the speech. The hash values determined for the portions of the speech, referred to as first hash values, may be determined on a temporal basis (e.g., a time chunk of the audio stream) or spatial basis (e.g., for a single word, a combination of words, or a complete clause, phrase, or sentence). Determining the first hash values includes computing the hash values based on the content of the portions of the speech, for example, using a hashing algorithm such as SHA-1, SHA-2, or SHA-3. The first hash values are compared against second hash values for elements of language within the audio profile to determine whether there is a match between any of the first hash values and any of the second hash values. A determination is made that a portion of the speech corresponds to language identified as undesirable based on a first hash value corresponding to that portion of the speech matching a second hash value corresponding to an element of language within the audio profile. Alternatively, where the technique 1000 is performed at a server device, detecting that the portion of the speech corresponds to language identified as undesirable can include obtaining, from a client application running at the participant device, an indication that the portion of the speech corresponds to the language identified as undesirable. In non-limiting examples, the portion of the speech determined as including undesirable language may include profanity or a filler word.

At 1006, a modified audio stream is produced by removing the portion of the speech from the audio stream. For example, removing the portion of the speech from the audio stream can include obfuscating the portion of the speech within the modified audio stream, omitting the portion of the speech from the modified audio stream, or replacing the portion of the speech with something else within the modified audio stream. Portions of the speech other than the portion of the speech may remain unmodified and unremoved within the modified audio stream.

At 1008, the output of the modified audio stream is caused in place of the audio stream (i.e., as originally obtained from the participant device above). The modified audio stream is output at all participant devices connected to the conference. Alternatively, the modified audio stream may be output at a limited number of participant devices connected to the conference. In one example, the modified audio stream may be output only at participant devices other than the one from which the audio stream is obtained. In another example, the modified audio stream may be output only at a subset of participant devices connected to the conference based on user accounts used at the subset of participant devices to access the conference having a domain that is different from a domain of the user account used at the participant device from which the audio stream is obtained.

In some implementations, the technique 1000 can include applying a filter to automate a removal of further instances of the language identified as undesirable from the audio stream. In some implementations, the technique 1000 can include presenting, based on detecting that the portion of the speech corresponds to language identified as undesirable, a prompt to the user of a participant device recommending to assert a filter against future audio stream content obtained from the participant device. In some implementations, the technique 1000 can include storing, based on the modification of the portion of the speech, configuration data indicating to remove the language identified as undesirable from a future audio stream during one or more future conferences. In some implementations, the technique 1000 can include notifying the user of the participant device of the removal of the portion of the speech from the audio stream.

In some implementations, the technique 1000 may include converting the portion of the speech into text and comparing the text against text of an audio profile to determine that the portion of the speech corresponds to language identified as undesirable. In at least some such cases, operations related to hashing may be omitted from the technique 1000.

The implementations of this disclosure correspond to methods, non-transitory computer readable media, apparatuses, systems, devices, and the like. In some implementations, a method comprises obtaining an audio stream representing speech of a user of a participant device connected to a conference; determining first hash values for portions of the speech; determining, by comparing the first hash values against second hash values for records of a data store, that a portion of the speech corresponds to a predefined sensitive topic indicated within the records; applying a filter against the portion of the speech to produce a modified audio stream within which the predefined sensitive topic is sanitized; and causing an output, within the conference, of the modified audio stream in place of the audio stream. In some implementations, a non-transitory computer readable medium stores instructions operable to cause one or more processors to perform operations comprising obtaining an audio stream representing speech of a user of a participant device connected to a conference; determining first hash values for portions of the speech; determining, by comparing the first hash values against second hash values for records of a data store, that a portion of the speech corresponds to a predefined sensitive topic indicated within the records; applying a filter against the portion of the speech to produce a modified audio stream within which the predefined sensitive topic is sanitized; and causing an output, within the conference, of the modified audio stream in place of the audio stream. In some implementations, an apparatus comprises a memory and a processor configured to execute instructions stored in the memory to obtain an audio stream representing speech of a user of a participant device connected to a conference; determine first hash values for portions of the speech; determine, by comparing the first hash values against second hash values for records of a data store, that a portion of the speech corresponds to a predefined sensitive topic indicated within the records; apply a filter against the portion of the speech to produce a modified audio stream within which the predefined sensitive topic is sanitized; and cause an output, within the conference, of the modified audio stream in place of the audio stream.

In some implementations of the method, non-transitory computer readable medium, or apparatus, portions of the speech other than the portion of the speech remain unfiltered within the modified audio stream.

In some implementations of the method, non-transitory computer readable medium, or apparatus, the records of the data store are populated by an entity having a domain with which a conference user account used at the participant device is associated.

In some implementations of the method, non-transitory computer readable medium, or apparatus, each record of the data store indicates a different predefined sensitive topic, and a record of the data store is removed from the data store upon a public disclosure of an associated predefined sensitive topic.

In some implementations of the method, non-transitory computer readable medium, or apparatus, the predefined sensitive topic relates to confidential information.

In some implementations of the method, non-transitory computer readable medium, or apparatus, the application of the filter causes an omission of the portion of the speech from within the modified audio stream.

In some implementations of the method, non-transitory computer readable medium, or apparatus, the application of the filter causes an obfuscation of the portion of the speech from within the modified audio stream.

In some implementations of the method, non-transitory computer readable medium, or apparatus, the application of the filter causes a replacement of the portion of the speech from within the modified audio stream with other audible content.

In some implementations of the method, non-transitory computer readable medium, or apparatus, causing the output of the modified audio stream in place of the audio stream comprises: causing the modified audio stream to be output at one or more participant devices connected to the conference based on conference user accounts used at the one or more participant devices corresponding other than to a domain associated with a conference user account used at the participant device from which the audio stream is obtained.

In some implementations of the method, non-transitory computer readable medium, or apparatus, causing the output of the modified audio stream in place of the audio stream comprises: transmitting the modified audio stream to one or more participant devices connected to the conference to cause the modified audio stream to be output at the one or more participant devices.

In some implementations of the method, non-transitory computer readable medium, or apparatus, the predefined sensitive topic corresponds to a codename.

In some implementations of the method, non-transitory computer readable medium, or apparatus, the conference is implemented by a UCaaS software platform.

In some implementations of the method, non-transitory computer readable medium, or apparatus, the method comprises, the operations comprise, and the processor is configured to execute the instructions for determining to compare the first hash values against the second hash values based on a mismatch between a first domain associated with a first conference user account used at the participant device and a second domain associated with a second conference user account used at another participant device connected to the conference.

In some implementations of the method, non-transitory computer readable medium, or apparatus, the method comprises, the operations comprise, and the processor is configured to execute the instructions for determining to apply the filter against the portion of the speech based on a mismatch between a first domain associated with a first conference user account used at the participant device and a second domain associated with a second conference user account used at another participant device connected to the conference.

In some implementations of the method, non-transitory computer readable medium, or apparatus, the modified audio stream is output to a first subset of participant devices connected to the conference and the audio stream is output to a second subset of the participant devices, conference user accounts used at the first subset of the participant devices are associated with a first domain different from a second domain with which a conference user account used at the participant device is associated with, and conference user accounts used at the second subset of the participant devices are associated with the second domain.

In some implementations of the method, non-transitory computer readable medium, or apparatus, a control policy restricts users of participant devices connected to the conference from altering the records of the data store.

In some implementations of the method, non-transitory computer readable medium, or apparatus, the modified audio stream is produced and output while the conference remains ongoing.

In some implementations of the method, non-transitory computer readable medium, or apparatus, the modified audio stream is produced and output during playback of a recording of the conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    obtaining an audio stream representing speech of a user of a participant device connected to a conference;
    determining first hash values for portions of the speech;
    determining, by comparing the first hash values against second hash values for records of a data store, that a portion of the speech corresponds to a predefined sensitive topic indicated within the records;
    applying a filter against the portion of the speech to produce a modified audio stream within which the predefined sensitive topic is sanitized; and
    causing an output, within the conference, of the modified audio stream in place of the audio stream.

2. The method of claim 1, wherein portions of the speech other than the portion of the speech remain unfiltered within the modified audio stream.

3. The method of claim 1, wherein the records of the data store are populated by an entity having a domain with which a conference user account used at the participant device is associated.

4. The method of claim 1, wherein each record of the data store indicates a different predefined sensitive topic, and wherein a record of the data store is removed from the data store upon a public disclosure of an associated predefined sensitive topic.

5. The method of claim 1, wherein the predefined sensitive topic relates to confidential information.

6. The method of claim 1, wherein the application of the filter causes an omission of the portion of the speech from within the modified audio stream.

7. The method of claim 1, wherein the application of the filter causes an obfuscation of the portion of the speech from within the modified audio stream.

8. The method of claim 1, wherein the application of the filter causes a replacement of the portion of the speech from within the modified audio stream with other audible content.

9. A non-transitory computer readable medium storing instructions operable to cause one or more processors to perform operations comprising:
    obtaining an audio stream representing speech of a user of a participant device connected to a conference;
    determining first hash values for portions of the speech;
    determining, by comparing the first hash values against second hash values for records of a data store, that a portion of the speech corresponds to a predefined sensitive topic indicated within the records;
    applying a filter against the portion of the speech to produce a modified audio stream within which the predefined sensitive topic is sanitized; and
    causing an output, within the conference, of the modified audio stream in place of the audio stream.

10. The non-transitory computer readable medium of claim 9, wherein the operations for causing the output of the modified audio stream in place of the audio stream comprise:
    causing the modified audio stream to be output at one or more participant devices connected to the conference based on conference user accounts used at the one or more participant devices corresponding other than to a domain associated with a conference user account used at the participant device from which the audio stream is obtained.

11. The non-transitory computer readable medium of claim 9, wherein the operations for causing the output of the modified audio stream in place of the audio stream comprise:
    transmitting the modified audio stream to one or more participant devices connected to the conference to cause the modified audio stream to be output at the one or more participant devices.

12. The non-transitory computer readable medium of claim 9, wherein the predefined sensitive topic corresponds to a codename.

13. The non-transitory computer readable medium of claim 9, wherein the conference is implemented by a unified communications as a service software platform.

14. An apparatus, comprising:
    a memory; and
    a processor configured to execute instructions stored in the memory to:
        obtain an audio stream representing speech of a user of a participant device connected to a conference;
        determine first hash values for portions of the speech;
        determine, by comparing the first hash values against second hash values for records of a data store, that a portion of the speech corresponds to a predefined sensitive topic indicated within the records;
        apply a filter against the portion of the speech to produce a modified audio stream within which the predefined sensitive topic is sanitized; and
        cause an output, within the conference, of the modified audio stream in place of the audio stream.

15. The apparatus of claim 14, wherein the processor is configured to execute the instructions to:
    determine to compare the first hash values against the second hash values based on a mismatch between a first domain associated with a first conference user account used at the participant device and a second domain associated with a second conference user account used at another participant device connected to the conference.

16. The apparatus of claim 14, wherein the processor is configured to execute the instructions to:
    determine to apply the filter against the portion of the speech based on a mismatch between a first domain associated with a first conference user account used at the participant device and a second domain associated with a second conference user account used at another participant device connected to the conference.

17. The apparatus of claim 14, wherein the modified audio stream is output to a first subset of participant devices connected to the conference and the audio stream is output to a second subset of the participant devices, wherein conference user accounts used at the first subset of the participant devices are associated with a first domain different from a second domain with which a conference user account used at the participant device is associated with, and wherein conference user accounts used at the second subset of the participant devices are associated with the second domain.

18. The apparatus of claim 14, wherein a control policy restricts users of participant devices connected to the conference from altering the records of the data store.

19. The apparatus of claim 14, wherein the modified audio stream is produced and output while the conference remains ongoing.

20. The apparatus of claim 14, wherein the modified audio stream is produced and output during playback of a recording of the conference.

* * * * *